US011236821B2

(12) United States Patent
Matsuo et al.

(10) Patent No.: US 11,236,821 B2
(45) Date of Patent: Feb. 1, 2022

(54) BELT-SLIPPAGE DIAGNOSTIC APPARATUS FOR BELT-TYPE CONTINUOUSLY-VARIABLE TRANSMISSION

(71) Applicant: TOYOTA JIDOSHA KABUSHIKI KAISHA, Toyota (JP)

(72) Inventors: Kenji Matsuo, Toyota (JP); Yuji Hattori, Ichinomiya (JP); Akihide Itoh, Nagoya (JP); Hideaki Bunazawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/135,007

(22) Filed: Dec. 28, 2020

(65) Prior Publication Data
US 2021/0215248 A1 Jul. 15, 2021

(30) Foreign Application Priority Data

Jan. 9, 2020 (JP) .............................. JP2020-002452

(51) Int. Cl.
*F16H 61/12* (2010.01)
*F16H 9/12* (2006.01)
*F16H 61/662* (2006.01)

(52) U.S. Cl.
CPC .............. *F16H 61/12* (2013.01); *F16H 9/12* (2013.01); *F16H 61/662* (2013.01); *F16H 2061/1208* (2013.01); *F16H 2061/1276* (2013.01); *F16H 2061/1288* (2013.01); *F16H 2061/6629* (2013.01)

(58) Field of Classification Search
CPC .......... F16H 9/12; F16H 61/12; F16H 61/662; F16H 2061/1208; F16H 2061/1276; F16H 2061/1288; F16H 2061/6629
See application file for complete search history.

(56) References Cited

U.S. PATENT DOCUMENTS

| 6,219,608 | B1 * | 4/2001 | Abo ................... F16H 61/66259 474/28 |
| 2006/0234828 | A1 * | 10/2006 | Iwatsuki ............. B60W 10/107 477/45 |
| 2011/0053720 | A1 * | 3/2011 | Kang .................... F16H 37/021 474/148 |
| 2015/0148158 | A1 * | 5/2015 | Nishida ..................... F16H 9/12 474/28 |
| 2017/0299050 | A1 * | 10/2017 | Sakagami ............. F16H 61/662 |

FOREIGN PATENT DOCUMENTS

| JP | 2003-329126 A | 11/2003 |
| JP | 2016-161046 A | 9/2016 |

* cited by examiner

*Primary Examiner* — Edwin A Young
(74) *Attorney, Agent, or Firm* — Oliff PLC

(57) ABSTRACT

A belt-slippage diagnostic apparatus for a continuously-variable transmission that includes a primary pulley, a secondary pulley and a belt looped over the primary and secondary pulleys. The belt-slippage diagnostic apparatus includes a slippage determination portion configured to determine occurrence of slippage of the belt on at least one of the primary and secondary pulleys, when a first-order derivative of a gear ratio, which is a ratio of a rotational speed of the primary pulley to a rotational speed of the secondary pulley, is not smaller than a first threshold value and a second-order derivative of the gear ratio is not smaller than a second threshold value.

8 Claims, 3 Drawing Sheets

BELT-SLIPPAGE DIAGNOSTIC APPARATUS FOR BELT-TYPE CONTINUOUSLY-VARIABLE TRANSMISSION

This application claims priority from Japanese Patent Application No. 2020-002452 filed on Jan. 9, 2020, the disclosure of which is herein incorporated by reference in its entirety.

FIELD OF THE INVENTION

The present invention relates to a belt-slippage diagnostic apparatus for a belt-type continuously-variable transmission including a primary pulley, a secondary pulley and a belt looped over the primary and secondary pulleys.

BACKGROUND OF THE INVENTION

There is well known a belt-type continuously-variable transmission including a primary pulley, a secondary pulley and a belt looped over the primary and secondary pulleys. Such a continuously-variable transmission is disclosed in JP-2003-329126A. This Japanese Patent Application Publication discloses that, in the continuously-variable transmission including an input member (corresponding to a primary pulley described in the present specification), an output member (corresponding to a secondary pulley described in the present specification) and a transmission member (corresponding to a belt described in the present specification) looped over the input and output members, a degree of deterioration of the transmission member is detected based on a correlation between slippage of the transmission member on one of the input and output members and a drive force transmitted through the transmission member.

SUMMARY OF THE INVENTION

By the way, in the above-identified Japanese Patent Application Publication, it is determined whether the slippage of the belt has occurred or not, based on a change of a gear ratio of the continuously-variable transmission. However, it could be determined that the slippage of the belt has occurred even in a case of an abrupt change of the gear ratio, which is caused by an abrupt shift operation or by an input from a road surface.

The present invention was made in view of the background art described above. It is therefore an object of the present invention to provide a belt-slippage diagnostic apparatus capable of accurately determining occurrence of slippage of a belt in a continuously-variable transmission that includes primary and secondary pulleys over which the belt is looped.

The object indicated above is achieved according to the following aspects of the present invention.

According to a first aspect of the invention, there is provided a belt-slippage diagnostic apparatus for a continuously-variable transmission that includes a primary pulley, a secondary pulley and a belt looped over the primary and secondary pulleys, the belt-slippage diagnostic apparatus comprising a slippage determination portion configured to determine occurrence of slippage of the belt on at least one of the primary and secondary pulleys, when a first-order derivative of a gear ratio, which is a ratio of a rotational speed of the primary pulley to a rotational speed of the secondary pulley, is not smaller than a first threshold value and a second-order derivative of the gear ratio is not smaller than a second threshold value.

According to a second aspect of the invention, the belt-slippage diagnostic apparatus according to the first aspect of the invention comprises a heat-quantity determination portion configured, when the occurrence of the slippage of the belt is determined by the slippage determination portion, to determine whether a heat quantity, which is a quantity of heat generated by the slippage of the belt, is a third threshold value or more.

According to a third aspect of the invention, the belt-slippage diagnostic apparatus according to the first or second aspect of the invention comprises a continuation-time determination portion configured to measure a continuation time for which the slippage of the belt has continued, and to determine whether the continuation time is a fourth threshold value or less.

According to a fourth aspect of the invention, the belt-slippage diagnostic apparatus according to any one of the first through third aspects of the invention comprises a slippage-number measure portion configured to measure a number of times of the occurrence of the slippage of the belt.

According to a fifth aspect of the invention, the belt-slippage diagnostic apparatus according to any one of the first through fourth aspects of the invention comprises a storage portion configured to store therein data upon the occurrence of the slippage of the belt, wherein the data include a command pressure value and an actual pressure value of a hydraulic actuator of the primary pulley, a command pressure value and an actual pressure value of a hydraulic actuator of the secondary pulley, and an input torque inputted to the continuously-variable transmission.

According to a sixth aspect of the invention, in the belt-slippage diagnostic apparatus according to the fifth aspect of the invention, the data stored in the storage portion further include a heat quantity that is a quantity of heat generated by the slippage of the belt.

According to a seventh aspect of the invention, the belt-slippage diagnostic apparatus according to any one of the first through sixth aspects of the invention comprises a heat-vibration determination portion configured, when the occurrence of the slippage of the belt is determined by the slippage determination portion, to determine whether a hydraulic vibration of a hydraulic pressure of a hydraulic actuator of the secondary pulley has occurred.

According to an eighth aspect of the invention, the belt-slippage diagnostic apparatus according to any one of the first through seventh aspects of the invention comprises a responsiveness-defect determination portion configured, when the occurrence of the slippage of the belt is determined by the slippage determination portion, to determine whether a responsiveness defect of a hydraulic pressure of a hydraulic actuator of the secondary pulley has occurred.

In the belt-slippage diagnostic apparatus according to the first aspect of the invention, the occurrence of the slippage of the belt is determined when the first-order derivative of the gear ratio is not smaller than the first threshold value and the second-order derivative of the gear ratio is not smaller than the second threshold value, so that the slippage of the belt can be accurately determined. For example, in an arrangement in which the occurrence of the slippage of the belt is determined based on only the first-order derivative of the gear ratio, the slippage cannot be distinguished from an abrupt change of the gear ratio, which is caused by an abrupt shift operation or by an input from a road surface, by seeing only the first-order derivative of the gear ratio. However, in the present embodiment, the occurrence of the slippage of the belt is determined based on not only the first-order derivative of the gear ratio but also the second-order derivative of the gear ratio, so that the occurrence of the micro slippage can be determined with an increased accuracy.

In the belt-slippage diagnostic apparatus according to the second aspect of the invention, when the occurrence of the slippage of the belt is determined, it is determined whether the heat quantity, which is the quantity of the heat generated by the slippage of the belt, is the third threshold value or more. Thus, it is possible to determine whether the occurred slippage of the belt is a slippage by which a durability of the belt could be reduced.

In the belt-slippage diagnostic apparatus according to the third aspect of the invention, it is possible to determine whether the occurred slippage of the belt is a micro slippage (that occurs for an extremely short time) or another type of slippage (such as a macro slippage), depending on whether the continuation time of the occurred slippage is at most the fourth threshold value or not.

In the belt-slippage diagnostic apparatus according to the fourth aspect of the invention, the number of times of the occurrence of the slippage of the belt is measured, so that a degree of reduction of a durability of the belt can be inferred based on the measured number of times of the occurrence of the slippage.

In the belt-slippage diagnostic apparatus according to the fifth aspect of the invention, the factor causing the slippage of the belt can be inferred based on the data upon the occurrence of the slippage, wherein the data include the command pressure value and the actual pressure value of the hydraulic actuator of the primary pulley, the command pressure value and the actual pressure value of the hydraulic actuator of the secondary pulley, and the input torque inputted to the continuously-variable transmission.

In the belt-slippage diagnostic apparatus according to the sixth aspect of the invention, the degree of reduction of the durability of the belt can be inferred based on the heat quantity that is the quantity of the heat generated by the slippage of the belt.

In the belt-slippage diagnostic apparatus according to the seventh aspect of the invention, it is determined whether the hydraulic vibration of the hydraulic pressure of the hydraulic actuator of the secondary pulley has occurred or not, when the occurrence of the slippage of the belt is determined. Thus, it is possible to infer whether or not the hydraulic vibration is the factor causing the slippage of the belt.

In the belt-slippage diagnostic apparatus according to the eighth aspect of the invention, it is determined whether the responsiveness defect of the hydraulic pressure of the hydraulic actuator of the secondary pulley has occurred or not, when the occurrence of the slippage of the belt is determined. Thus, it is possible to infer whether or not the responsiveness defect of the hydraulic pressure is the factor causing the slippage of the belt.

DETAILED DESCRIPTION OF PREFERRED EMBODIMENTS

Hereinafter, preferred embodiments of the invention will be described in detail with reference to the accompanying drawings. The figures of the drawings are simplified or deformed as needed, and each portion is not necessarily precisely depicted in terms of dimension ratio, shape, etc.

First Embodiment

Figure 1:
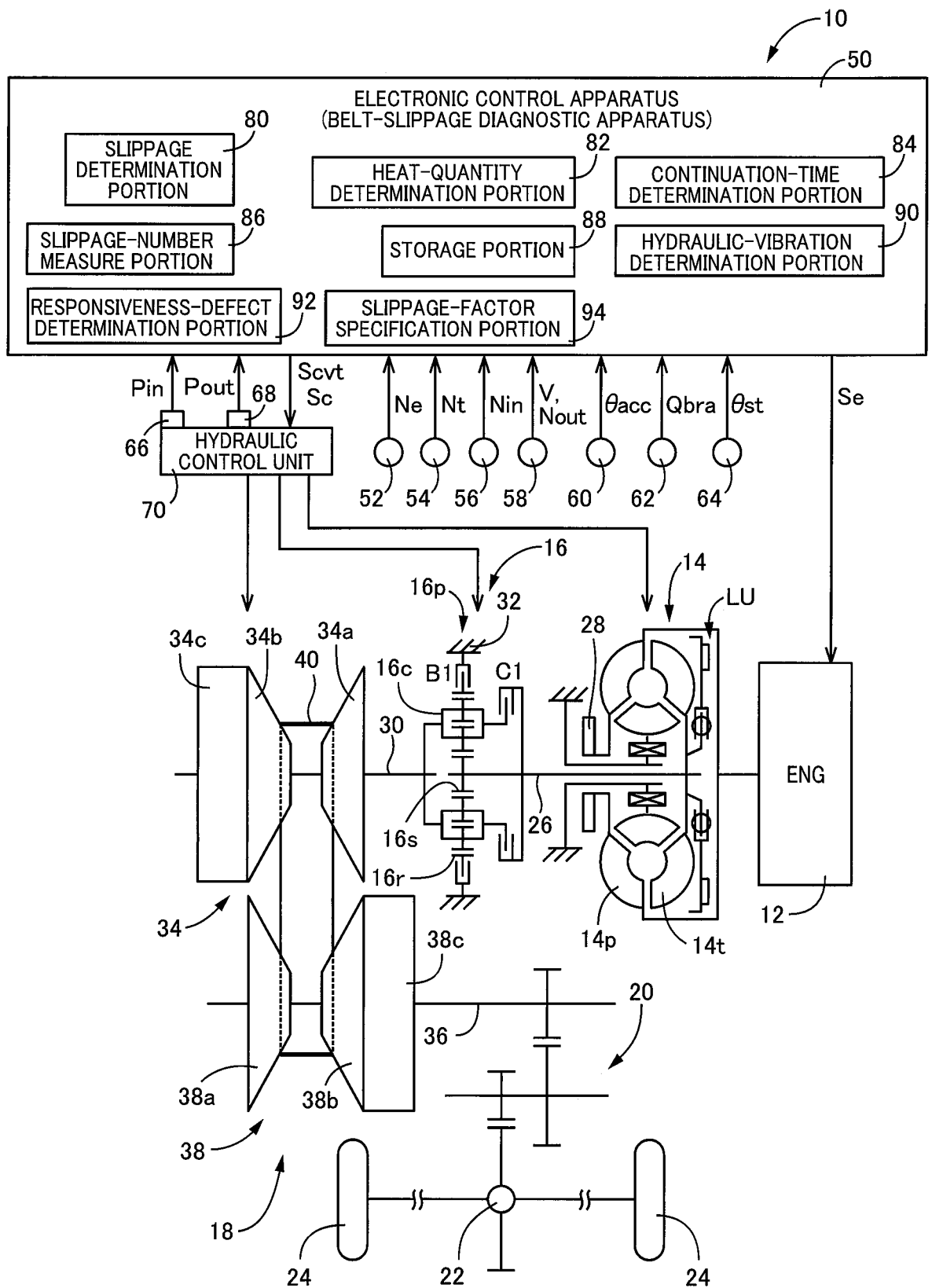
FIG. 1 is a schematic view showing a construction of a vehicle to which the present invention is applied, and showing also major portions of control functions and control systems that are provided to perform various control operations in the vehicle.

FIG. 1 is a schematic view showing a construction of a vehicle 10 to which the present invention is applied, and showing also major portions of control functions and control systems that are provided to perform various control operations in the vehicle 10. As shown in FIG. 1, the vehicle 10 includes an engine 12 as a drive force source for driving the vehicle 10, a torque converter 14 as a fluid-operated type drive-force transmission device, a forward/reverse switching device 16, a belt-type continuously-variable transmission 18, a reduction gear device 20, a differential gear device 22 and right and left drive wheels 24. In the vehicle 10, a drive force outputted by the engine 12 is transmitted to the right and left wheels 24, sequentially through the torque converter 14, forward/reverse switching device 16, continuously-variable transmission 18, reduction gear device 20 and differential gear device 22, for example.

The torque converter 14 includes a pump impeller 14$p$ and a turbine impeller 14$t$ and is configured to transmit the drive force through a fluid. The pump impeller 14$p$ is connected to the engine 12, while the turbine impeller 14$t$ is connected to the forward/reverse switching device 16 through a turbine shaft 26. The torque converter 14 is provided with a known lockup clutch in the form of a clutch LU that is configured to connect between input and output rotary members of the torque converter 14, namely, between the pump impeller 14$p$ and the turbine impeller 14$t$. An operation state of the clutch LU is categorized into, for example, three states that consist of a so-called lockup released state (lockup off) in which the clutch LU is released, a so-called lockup slipped state (slipped state) in which the clutch LU is partially-engaged (slip-engaged) with slippage and a so-called lockup engaged state (lockup on) in which the clutch LU is fully engaged.

With the clutch LU being placed in the release state, the torque converter 14 provides a torque boost effect. With the clutch LU being placed in the engaged state, the pump impeller 14$p$ and the turbine impeller 14$t$ are rotated integrally with each other whereby the drive force of the engine 12 is directly transmitted toward the forward/reverse switching device 16. With the clutch LU being slip-engaged, the turbine shaft 26 is rotated following rotation of a crank shaft of the engine 12 with a certain slip amount during running of the vehicle 10 in a driving state (power-on state), and the crank shaft of the engine 12 is rotated following rotation of the turbine shaft 26 with a certain slip amount during running of the vehicle 10 in a driven state (power-off state). Further, a mechanical oil pump 28 is connected to the pump impeller 14$p$.

The forward/reverse switching device 16 is constituted mainly by a forward drive clutch C1, a reverse drive brake B1 and a planetary gear device 16p of double-pinion type. The planetary gear device 16p includes a sun gear 16s connected integrally to the turbine shaft 26 of the torque converter 14 and a carrier 16c connected integrally to the input shaft 30 of the continuously-variable transmission 18. The carrier 16c and the sun gear 16s are to be selectively connected to each other through the forward drive clutch C, so that the planetary gear device 16p is rotated as a unit when the carrier 16c and the sun gear 16s are connected to each other. That is, the forward drive clutch C1 is a clutch element by which the planetary gear device 16p is to be selectively rotated as a unit.

The planetary gear device 16p further includes a ring gear 16r that is be selectively fixed to a housing 32 as a non-rotary member through the reverse drive brake B1. That is, the reverse drive brake B1 serves as a brake element that is configured to selectively connect one of rotary elements (in the form of the sun gear 16s, carrier 16c and ring gear 16r) to the housing 32. Each of the forward drive clutch C1 and the reverse drive brake B1 is a known hydraulically-operated frictional engagement device.

In the forward/reverse switching device 16 constructed as described above, when the forward drive clutch C1 is engaged with the reverse drive brake B1 being released, the turbine shaft 26 is connected to the input shaft 30 whereby a forward drive-force transmission path is established. When the reverse drive brake B1 is engaged with the forward drive clutch C1 being released, a reverse drive-force transmission path is established in the forward/reverse switching device 16 whereby the input shaft 30 is to be rotatable in a direction opposite to a direction of rotation of the turbine shaft 26. When the forward drive clutch C1 and the reverse drive brake B1 are both released, the forward/reverse switching device 16 is placed in a neutral state (drive-force transmission cut-off state) in which transmission of the drive force is cut off.

The continuously-variable transmission 18 includes an input-side pulley in the form of a primary pulley 34 provided on the input shaft 30, an output-side pulley in the form of a secondary pulley 38 provided on an output shaft 36, and a transmission belt 40 wound on or looped over the primary and secondary pulleys 34, 38. Each of the pulleys 34, 38 has a variable effective diameter. The continuously-variable transmission 18 constitutes a part of a drive-force transmission path between the forward/reverse switching device 16 and the drive wheels 24, and is configured to transmit the drive force, owing to a friction force acting between the transmission belt 40 and each of the primary and secondary pulleys 34, 38. The transmission belt 40 is constituted by a compression-type endless annular transmission belt that includes an endless annular hoop and a multiplicity of thick-plate-shaped block elements that are held by the endless annular hoop so as to be arranged in their thickness direction corresponding to a circumferential direction of the transmission belt 40, along the endless annular hoop. It is noted that the transmission belt 40 corresponds to "belt" recited in the appended claims.

The primary pulley 34 as the input-side pulley includes an input-side fixed rotary body in the form of a fixed sheave 34a that is fixed to the input shaft 30, an input-side movable rotary body in the form of a movable sheave 34b unrotatable relative to the input shaft 30 and axially movable relative to the input shaft 30, and a hydraulic actuator (hydraulic cylinder) 34c configured to apply an input-side thrust (primary thrust) Win (=primary pressure Pin×pressure receiving area) for changing a width of a V-shaped groove defined between the fixed and movable sheaves 34a, 34b of the primary pulley 34.

The secondary pulley 38 as the output-side pulley includes an output-side fixed rotary body in the form of a fixed sheave 38a that is fixed to the output shaft 36, an output-side movable rotary body in the form of a movable sheave 38b unrotatable relative to the output shaft 36 and axially movable relative to the output shaft 36, and a hydraulic actuator (hydraulic cylinder) 38c configured to apply an output-side thrust (secondary thrust) Wout (=secondary pressure Pout×pressure receiving area) for changing a width of a V-shaped groove defined between the fixed and movable sheaves 38a, 38b of the secondary pulley 38.

The vehicle 10 further includes a hydraulic control unit (hydraulic control circuit) 70 configured to control the primary pressure Pin that is a hydraulic pressure of a working fluid supplied to the hydraulic actuator 34c of the primary pulley 34 and also the secondary pressure Pout that is a hydraulic pressure of the working fluid supplied to the hydraulic actuator 38c of the secondary pulley 38. The primary thrust Win and the secondary thrust Wout are controlled with the primary pressure Pin and the secondary pressure Pout being regulated or controlled. With the primary and secondary thrusts Win, Wout being changed, the width of the V-shaped groove of the pulleys 34, 38 are changed whereby the effective diameter of each of the pulleys 34, 38, namely, a diameter of a mounted portion of each of the pulleys 34, 38 on which the transmission belt 40 is mounted, is changed, so that a gear ratio γ (=input-shaft rotational speed Nin/output rotational speed Nout) is continuously changed, while the friction force (belt clamp force) acting between the transmission belt 40 and each of the pulleys 34, 38 is controlled for avoiding slippage of the transmission belt 40 on the pulleys 34, 38. Thus, with the primary thrust Win and the secondary thrust Wout being controlled, the actual gear ratio γ is controlled to a target gear ratio γtgt while the slippage of the transmission belt 40 is prevented.

The vehicle 10 is provided with an electronic control apparatus 50 configured to perform various control operations in the vehicle 10. For example, the electronic control apparatus 50 includes a so-called microcomputer incorporating a CPU, a ROM, a RAM and an input-output interface. The CPU performs the control operations of the vehicle 10, by processing various input signals, according to control programs stored in the ROM, while utilizing a temporary data storage function of the RAM. The electronic control apparatus 50 is configured to perform, for example, an engine control operation for controlling an output of the engine 12, a shifting control operation for the continuously-variable transmission 18 and a belt-clamp-force control operation for the continuously-variable transmission 18. The electronic control apparatus 50 may be constituted by two or more control units exclusively assigned to perform different control operations such as the engine control operation for the engine 12 and a hydraulic-pressure control operation (including the shifting control operation and the belt-clamp-force control operation) for the continuously-variable transmission 18.

The electronic control apparatus 50 receives various input signals based on values detected by respective sensors provided in the vehicle 10. Specifically, the electronic control apparatus 50 receives: an output signal of an engine speed sensor 52 indicative of an engine rotational speed Ne (rpm) which is a rotational speed of the engine 12; an output signal of a turbine speed sensor 54 indicative of a turbine rotational speed Nt (rpm); an output signal of an input-shaft speed sensor 56 indicative of a an input-shaft rotational speed Nin (rpm) of the input shaft 30; an output signal of an output-shaft speed sensor 58 indicative of an output-shaft rotational speed Nout (rpm) which is a rotational speed of the output shaft 36 and which corresponds to the running speed V (km/h) of the vehicle 10; an output signal of an accelerator-opening degree sensor 60 indicative of an accelerator opening degree θacc (%); an output signal of a brake-operation amount sensor 62 indicative of a brake operation amount Qbra that is an operation amount of a brake operation member operated by a vehicle driver so as to operate a wheel brake device; an output signal of a steering angle sensor 64 indicative of a steering angle θst of a steering wheel; an output signal of a hydraulic pressure sensor 66 indicative of the primary pressure Pin (Pa) that is the hydraulic pressure (actual pressure value) of the working fluid supplied to the hydraulic actuator 34c of the primary pulley 34; and an output signal of a hydraulic pressure sensor 68 indicative of the secondary pressure Pout (Pa) that is the hydraulic pressure (actual pressure value) of the working fluid supplied to the hydraulic actuator 38c of the primary pulley 38. It is noted that the input-shaft rotational speed Nin is equal to a primary rotational speed Npri that is a rotational speed of the primary pulley 34, and that the output-shaft rotational speed Nout is equal to a secondary rotational speed Nsec that is a rotational speed of the secondary pulley 38.

The electronic control apparatus 50 generates various output signals which are supplied to various devices (such as the engine 12 and the hydraulic control unit 70) provided in the vehicle 10, and which include an engine-output-control command signal Se for controlling the output of the engine 12, a CVT-hydraulic-pressure-control command signal Scvt for controlling hydraulic pressures related to shifting actions of the continuously-variable transmission 18, and a hydraulic-pressure-control command signal Sc for controlling hydraulic pressures related to engaging actions of the clutch LU, the forward drive clutch C1 and the reverse drive brake B1.

The electronic control apparatus 50 calculates a required drive force in accordance with a pre-stored relationship, based on the running speed V and the accelerator opening degree θacc detected by the accelerator-opening degree sensor 60, and determines a target engine output and a target gear ratio γtgt that cooperate with each other to provide the required drive force with an optimum fuel efficiency. Then, the electronic control apparatus 50 executes the engine control operation for controlling the output of the engine 12 so as to obtain the target engine output, and, at the same time, executes the shifting control operation for controlling the gear ratio γ of the continuously-variable transmission 18 so as to obtain the target gear ratio γtgt.

By the way, it is known that, during running of the vehicle 10, so-called small or micro slippage could occur, namely, slippage of the transmission belt 40 on the pulleys 34, 38 could occur for an extremely short time. Since the micro slippage could cause wear of the transmission belt 40 and affect durability of the transmission belt 40, it is necessary to accurately determine the occurrence of the micro slippage. Further, in event of the occurrence of the micro slippage, it is desirable to specify a factor causing the micro slippage. In the present embodiment, the electronic control apparatus 50 includes a function of determining the occurrence of the micro slippage and a function of inferring the factor causing the micro slippage. For performing these functions, the electronic control apparatus 50 functionally includes a slippage determination portion 80 serving as a slippage determination means, a heat-quantity determination portion 82 serving as a heat-quantity determination means, a continuation-time determination portion 84 serving as a continuation-time determination means, a slippage-number measure portion 86 serving as a slippage-number measure means, a storage portion 88 serving as a storage means, a hydraulic-vibration determination portion 90 serving as a hydraulic-vibration determination means, a responsiveness-defect determination portion 92 serving as a responsiveness-defect determination means, and a slippage-factor specification portion 94 serving as a slippage-factor specification means. It is noted that the electronic control apparatus 50 corresponds to "belt-slippage diagnostic apparatus" recited in the appended claims.

The slippage determination portion 80 determines whether the micro slippage has occurred or not during running of the vehicle 10. The slippage determination portion 80 calculates, as needed, a gear ratio γ (=Npri/Nsec=Nin/Nout) of the continuously-variable transmission 18 that is a ratio of the rotational speed of the primary pulley 34 to the rotational speed of the secondary pulley 38. Further, the slippage determination portion 80 calculates, as needed, a first-order derivative Δγ of the gear ratio γ, which corresponds to a rate of change of the gear ratio γ. The first-order derivative Δγ of the gear ratio γ is obtained by numerically differentiating the gear ratio γ, or smoothing the gear ratio γ through a filter or the like and then obtaining a gradient of a smoothed value of the gear ratio γ. Then, the slippage determination portion 80 calculates a second-order derivative ΔΔγ of the gear ratio γ. The second-order derivative ΔΔγ of the gear ratio γ is obtained by numerically differentiating the first-order derivative Δγ, or smoothing the first-order derivative Δγ through a filter or the like and then obtaining a gradient of a smoothed value of the first-order derivative Δγ.

Further, the slippage determination portion 80 determines whether the calculated first-order derivative Δγ of the gear ratio γ is at least a first threshold value α1 or not. The first threshold value α1 is a predetermined value that is obtained by experimentation or determined by an appropriate design theory, such that the first threshold value α1 corresponds to a lower limit of a range of the first-order derivative Δγ in which it can be determined that the micro slippage of the transmission belt 40 has occurred. Then, when determining that the first-order derivative Δγ is not smaller than the first threshold value α1, the slippage determination portion 80 determines whether the second-order derivative ΔΔγ of the gear ratio γ is at least a second threshold value α2 or not. The second threshold value α2 is a predetermined value that is obtained by experimentation or determined by an appropriate design theory, such that the second threshold value α2 corresponds to a lower limit of a range of the second-order derivative ΔΔγ in which it can be determined that the micro slippage of the transmission belt 40 has occurred. The slippage determination portion 80 determines that the micro slippage has occurred when the first-order derivative Δγ of the gear ratio γ is not smaller than the first threshold value α1 and the second-order derivative ΔΔγ of the gear ratio γ is not smaller than the second threshold value α2. In this instance, the slippage determination portion 80 sets a provisional flag of the occurrence of the micro slippage, to ON.

The occurrence of the micro slippage can be determined based on only the first-order derivative Δγ of the gear ratio γ. However, there might be a case in which the micro slippage cannot be distinguished from an abrupt change of the gear ratio γ, which is caused by an abrupt shift operation or by an input from a road surface such as a stepped surface, by seeing only the first-order derivative Δγ. However, in the present embodiment, the occurrence of the micro slippage is determined based on not only the first-order derivative Δγ of the gear ratio γ but also the second-order derivative ΔΔγ of the gear ratio γ, so that the occurrence of the micro slippage can be accurately determined.

When the occurrence of the micro slippage is determined by the slippage determination portion 80, the heat-quantity determination portion 82 calculates the heat quantity Qdot that is a quantity of heat generated by the micro slippage. The heat quantity Qdot is obtained based on a product of a friction force generated between the secondary pulley 38 and the transmission belt 40, and a relative slip speed of the secondary pulley 38 and the transmission belt 40. Specifically, the heat quantity Qdot is calculated in accordance with expression (1) given below. In the expression (1), "μ" represents a coefficient of static friction between the secondary pulley 38 and the transmission belt 40 and the static friction coefficient, "R" represents a winding radius of the secondary pulley 38 on which the transmission belt 40 is wound, and "θ" represents a sheave angle of the secondary pulley 38 that defines the V-shaped groove in which the transmission belt 40 is disposed to be gripped. Further, in the expression (1), "Wout" represents a secondary thrust, and corresponds to a clamp force by which the transmission belt 40 is clamped by the secondary pulley 38. The heat-quantity determination portion 82 calculates the heat quantity Qdot, as needed, in accordance with the expression (1), from a point of time at which the occurrence of the micro slippage is determined, and then determines a maximum value (peak value) of the heat quantity Qdot. In the present embodiment, the heat quantity Qdot in the secondary pulley 38 is calculated in accordance with the expression (1), with an assumption that the heat quantity Qdot in the secondary pulley 38 is larger than the heat quantity Qdot in the primary pulley 34. However, in a case in which the heat quantity Qdot in the primary pulley 34 is larger, the heat quantity Qdot in the primary pulley 34 may be calculated. Further, it is also possible to calculate both of the heat quantity Qdot in the primary pulley 34 and the heat quantity Qdot in the secondary pulley 38 and to use a larger one of the calculated heat quantities Qdot.

$$Q\text{dot}=2\times\mu\times R\times W\text{out}/\cos\theta\times[N\text{sec}-(N\text{pri}/\gamma)] \quad (1)$$

After calculating the heat quantity Qdot, the heat-quantity determination portion 82 determines whether the maximum value of the heat quantity Qdot is at least a third threshold value α3 or not. The third threshold value α3 is a predetermined value that is obtained by experimentation or determined by an appropriate design theory, such that the third threshold value α3 corresponds to, for example, a lower limit of a range of the heat quantity Qdot in which it is considered that the durability of the transmission belt 40 is affected. Therefore, when the heat-quantity determination portion 82 determines that the maximum value of the heat quantity Qdot is not smaller than the third threshold value α3, it is determined that the occurred micro slippage is slippage affecting the durability of the transmission belt 40. On the other hand, when the heat-quantity determination portion 82 determines that the maximum value of the heat quantity Qdot is smaller than the third threshold value α3, it is determined that the occurred micro slippage is slippage not affecting the durability of the transmission belt 40.

When the occurrence of the micro slippage is detected, the continuation-time determination portion 84 measures a continuation time tcon that is a length of time from the determination of the occurrence of the micro slippage until termination of the micro slippage, and determines whether the continuation time tcon is at most a fourth threshold value α4 or not. The termination of the micro slippage is determined, for example, when the first-order derivative Δγ of the gear ratio γ has become smaller than the first threshold value α1. The fourth threshold value α4 is a predetermined value that is obtained by experimentation or determined by an appropriate design theory, such that the fourth threshold value α4 corresponds to, for example, an upper limit of a range of the continuation time tcon in which it can be determined that the occurred slippage is definitely the micro slippage. When the continuation-time determination portion 84 determines that the continuation time tcon is not longer than the fourth threshold value α4, it is determined that the occurred slippage is definitely the micro slippage. On the other hand, when the continuation-time determination portion 84 is longer than the fourth threshold value α4, it is determined that the occurred slippage is a large or macro slippage that continues for a relatively large length of time. The macro slippage is a phenomenon that is to be distinguished from the micro slippage.

The slippage determination portion 80 sets a definitive flag of the occurrence of the micro slippage, to ON, in a case in which the occurrence of the micro slippage is detected with the heat quantity Qdot being not smaller than the third threshold value α3 and with the continuation time tcon being not longer than the fourth threshold value α4.

The slippage-number measure portion 86 measures a number N1 (integrated value) of times of occurrence of the micro slippage, which corresponds to a number of times of the judgement of the occurrence of the micro slippage in the vehicle 10. The slippage-number measure portion 86 adds one to the number N1 of times of occurrence of the micro slippage, each time when the definitive flag of the occurrence of the micro slippage is set to ON. Since the durability of the transmission belt 40 is reduced with increase of the number N1 of times of occurrence of the micro slippage, a degree of the reduction of the durability of the transmission belt 40 can be inferred based on the number N1 of times of occurrence of the micro slippage.

When the occurrence of the micro slippage is detected, the storage portion 88 stores therein a time (year, month, day, hour, minute, second) of the occurrence of the micro slippage, the heat quantity Qdot (peak value) upon the occurrence of the micro slippage, a command pressure value Pintgt and a primary pressure Pin (hereinafter referred to as "actual pressure value Pin") of the hydraulic actuator 34c of the primary pulley 34 upon the occurrence of the micro slippage, a command pressure value Pouttgt and a secondary pressure Pout (hereinafter referred to as "actual pressure value Pout") of the hydraulic actuator 38c of the secondary pulley 38 upon the occurrence of the micro slippage, and an input torque Tin that is a value of a torque inputted to the continuously-variable transmission 18 upon the occurrence of the micro slippage, for example. The input torque Tin is calculated, as needed, based on the accelerator opening degree θacc, the running speed V and a torque ratio of the torque converter 14, for example. When the micro slippage is detected for the first time in the vehicle 10, the storage portion 88 stores therein, for example, the time of the first occurrence of the micro slippage. The factor causing the micro slippage and the degree of the reduction of the durability of the transmission belt 40 due to the micro slippage can be inferred by analyzing the above-described various data (various information) stored in the storage portion 88. For example, the degree of the reduction of the durability of the transmission belt 40 due to the micro slippage can be inferred based on the heat quantity Qdot upon the occurrence of the micro slippage.

Further, during a period from start of the micro slippage until termination of the micro slippage, the storage portion 88 calculates, as needed, a difference $\Delta$Pin (=Pintgt−Pin) between the command pressure value Pintgt and the actual pressure value Pin (primary pressure Pin) of the hydraulic actuator 34c of the primary pulley 34, and stores a maximum value of the difference $\Delta$Pin therein. Similarly, during the period from start of the micro slippage until termination of the micro slippage, the storage portion 88 calculates, as needed, a difference $\Delta$Pout (=Poutgt−Pout) between the command pressure value Poutgt and the actual pressure value Pout (secondary pressure Pout) of the hydraulic actuator 38c of the secondary pulley 38, and stores a maximum value of the difference $\Delta$Pout therein. The factor causing the micro slippage can be inferred also from these differences $\Delta$Pin, $\Delta$Pout stored in the storage portion 88. For example, when the differences $\Delta$Pin, $\Delta$Pout are large, it is possible to infer that the factor causing the micro slippage is occurrence of a hydraulic control defect in which the actual pressure values Pin, Pout are insufficient relative to the input torque Tin inputted to the continuously-variable transmission 18. When the differences $\Delta$Pin, $\Delta$Pout are small, it is possible to infer that the factor causing the micro slippage is occurrence of a hydraulic control defect in which the command pressure values Pintgt, Pouttgt are insufficient relative to the input torque Tin inputted to the continuously-variable transmission 18.

When the occurrence of the micro slippage is determined, the hydraulic-vibration determination portion 90 determines whether a hydraulic fluctuation or vibration has occurred in the actual pressure value Pout of the hydraulic actuator 38c of the secondary pulley 38 substantially concurrently with the occurrence of the micro slippage. The hydraulic-vibration determination portion 90 calculates a standard deviation of the actual pressure value Pout in a period from start of the micro slippage until termination of the micro slippage, and determines that the hydraulic vibration has occurred when the standard deviation is at least a fifth threshold value $\alpha$5. In this instance, the hydraulic-vibration determination portion 90 sets a hydraulic-vibration occurrence flag to ON. The fifth threshold value $\alpha$5 is a predetermined value that is obtained by experimentation or determined by an appropriate design theory, such that the fifth threshold value $\alpha$5 corresponds to a lower limit of a range of the standard deviation in which it can be determined that the hydraulic vibration has occurred. When setting the hydraulic-vibration occurrence flag to ON, the slippage-factor specification portion 94 adds one to a number N2 (integrated value) of times of occurrence of the micro slippage due to the hydraulic vibration. Thus, it is possible to infer that the factor causing the micro slippage is the hydraulic vibration, when the number N2 of times of occurrence of the micro slippage due to the hydraulic vibration is increased.

When the occurrence of the micro slippage is determined, the responsiveness-defect determination portion 92 determines whether a responsiveness defect of the secondary pressure Pout has occurred upon occurrence of the micro slippage (during the period of occurrence of the micro slippage). The responsiveness-defect determination portion 92 calculates the difference $\Delta$Pout (=Poutgt−Pout) between the command pressure value Poutgt and the actual pressure value Pout of the hydraulic actuator 38c of the secondary pulley 38, during the period from start of the micro slippage until termination of the micro slippage, and determines that the responsiveness defect of the secondary pressure Pout has occurred when the difference $\Delta$Pout is at least a sixth threshold value $\alpha$6. In this instance, the responsiveness-defect determination portion 92 sets a pressure-responsiveness defect occurrence flag to ON. The sixth threshold value $\alpha$6 is a predetermined value that is obtained by experimentation or determined by an appropriate design theory, such that the sixth threshold value $\alpha$6 corresponds to a lower limit of a range of the difference $\Delta$Pout in which it can be determined that the responsiveness defect of the secondary pressure Pout has occurred. When setting the pressure-responsiveness defect occurrence flag to ON, the slippage-factor specification portion 94 adds one to a number N3 (integrated value) of times of occurrence of the micro slippage due to the responsiveness defect. Thus, it is possible to infer that the factor causing the micro slippage is the responsiveness defect, when the number N3 of times of occurrence of the micro slippage due to the responsiveness defect is increased.

Further, when both of the hydraulic-vibration occurrence flag and the pressure-responsiveness defect occurrence flag are OFF, the slippage-factor specification portion 94 adds one to a number N4 (integrated value) of times of occurrence of the micro slippage due to another factor that is other than the hydraulic vibration and the responsiveness defect. Thus, it is possible to infer that the factor causing the micro slippage is the other factor other than the hydraulic vibration and the responsiveness defect, when the number N4 of times of occurrence of the micro slippage due to the other factor is increased.

Figure 2:
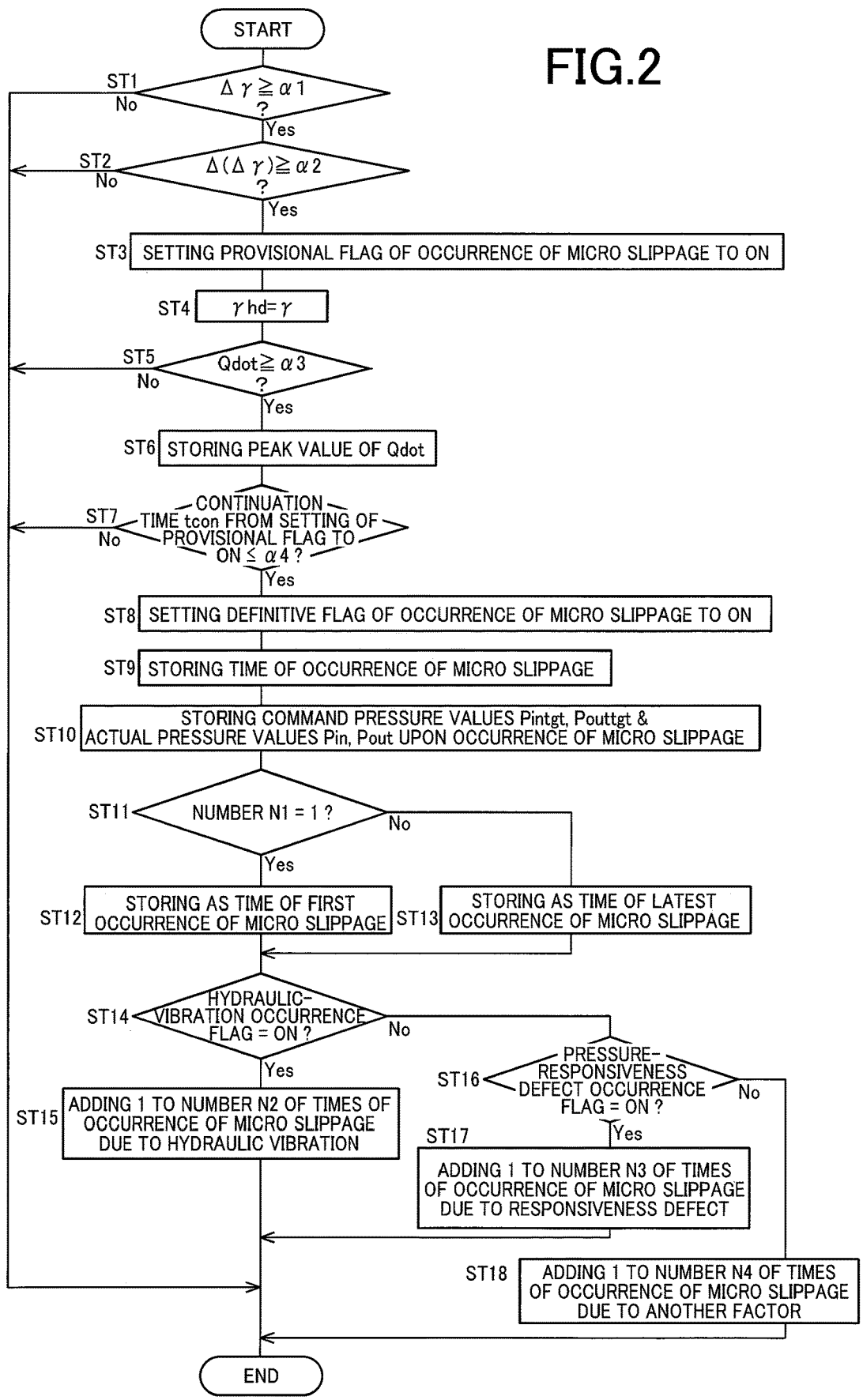
FIG. 2 is a flow chart for explaining a major portion of a control operation of an electronic control apparatus shown in FIG. 1, and for explaining a control routine executed by the electronic control apparatus, so as to determine occurrence of micro slippage during running of the vehicle and specify a factor causing the micro slippage.

FIG. 2 is a flow chart for explaining a major portion of a control operation of the electronic control apparatus 50, and for explaining a control routine executed by the electronic control apparatus 50, so as to determine occurrence of the micro slippage during running of the vehicle 10 and specify the factor causing the micro slippage. This control routine is executed in a repeated manner during running of the vehicle.

This control routine is initiated with step ST1 corresponding to control function of the slippage determination portion 80, which is implemented to determine whether the first-order derivative $\Delta\gamma$ of the gear ratio $\gamma$ is the first threshold value $\alpha$1 or more. When a negative determination is made at step ST1, one cycle of execution of the control routine is terminated. When an affirmative determination is made at step ST1, step ST2 corresponding to control function of the slippage determination portion 80 is implemented to determine whether the second-order derivative $\Delta\Delta\gamma$ of the gear ratio $\gamma$ is the second threshold value $\alpha$2 or more. When a negative determination is made at step ST2, one cycle of execution of the control routine is terminated. When an affirmative determination is made at step ST2, step ST3 corresponding to control function of the slippage determination portion 80 is implemented to set the provisional flag of the occurrence of the micro slippage, to ON. Then, at step ST4, the gear ratio $\gamma$ at a point of time at which the provisional flag is set to ON, is stored as a gear ratio $\gamma$hd at a point of time at which the micro slippage is started. Step ST4 is followed by step ST5 corresponding to control function of the heat-quantity determination portion 82, which is implemented to calculate the heat quantity Qdot and then to determine whether the heat quantity Qdot is the third threshold value 3 or more. When a negative determination is made at step ST5, one cycle of execution of the control routine is terminated. When an affirmative determination is made at step ST5, step ST6 corresponding to control function of the storage portion 88 is implemented to store the maximum value (peak value) of the heat quantity Qdot.

Then, at step ST7 corresponding to control function of the continuation-time determination portion 84, it is determined whether the continuation time tcon from the point of time at which the provisional flag is set to ON is the fourth threshold value $\alpha 4$ or less. When a negative determination is made at step ST7, one cycle of execution of the control routine is terminated. When an affirmative determination is made at step ST7, step ST8 corresponding to control function of the slippage determination portion 80 is implemented to set the definitive flag of the occurrence of the micro slippage of the transmission belt 40, to ON. Then, at step ST9 corresponding to control function of the storage portion 88, the time (year, month, day, hour, minute, second) of occurrence of the micro slippage is stored. Then, at step ST10 corresponding to control function of the storage portion 88, the command pressure value Pintgt and the actual pressure value Pin of the hydraulic actuator 34$c$ of the primary pulley 34 upon occurrence of the micro slippage, and the difference $\Delta$Pin between the command pressure value Pintgt and the actual pressure value Pin are stored in the storage portion 88. Further, at step ST10, the command pressure value Pouttgt and the actual pressure value Pout of the hydraulic actuator 38$c$ of the secondary pulley 38 upon occurrence of the micro slippage, and the difference $\Delta$Pout between the command pressure value Pouttgt and the actual pressure value Pout are stored in the storage portion 88.

Then, step ST11 corresponding to control function of the slippage-number measure portion 86 is implemented to determine whether the number N1 of times of occurrence of the micro slippage is one or not. When an affirmative determination is made at step ST11, the time stored at step ST9 is stored as the time of a first occurrence of the micro slippage at step ST12 corresponding to control function of the storage portion 88. When a negative determination is made at step ST11, the time stored at step ST9 is stored as the time of a latest occurrence of the micro slippage at step ST13 corresponding to control function of the storage portion 88.

Step ST12 or step ST13 is followed by step ST14 corresponding to control function of the hydraulic-vibration determination portion 90, which is implemented to determine whether the hydraulic-vibration occurrence flag is ON or not, namely, to determine whether the hydraulic vibration of the secondary pressure Pout has occurred upon occurrence of the micro slippage. When the occurrence of the micro slippage is determined, the determination as to whether the hydraulic vibration has occurred or not is made. When the occurrence of the hydraulic vibration is determined, the hydraulic-vibration occurrence flag is set to ON. At step ST14, it is determined whether the hydraulic-vibration occurrence flag is ON or not. When an affirmative determination is made at step ST14, step ST15 corresponding to control function of the slippage-factor specification portion 94 is implemented to add one to the number N2 of times of occurrence of the micro slippage due to the hydraulic vibration. When a negative determination is made at step ST14, step ST16 corresponding to control function of the responsiveness-defect determination portion 92 is implemented to determine whether the above-described pressure-responsiveness defect occurrence flag is ON or not, namely, to determine whether the responsiveness defect of the secondary pressure Pout has occurred upon occurrence of the micro slippage. When the occurrence of the micro slippage is determined, the determination as to whether the responsiveness defect has occurred or not is made. When the occurrence of the responsiveness defect is determined, the pressure-responsiveness defect occurrence flag is set to ON. At step ST16, it is determined whether the pressure-responsiveness defect occurrence flag is ON or not. When an affirmative determination is made at step ST16, step ST17 corresponding to control function of the slippage-factor specification portion 94 is implemented to add one to the number N3 of times of occurrence of the micro slippage due to the responsiveness defect. When a negative determination is made at step ST16, the control flow goes to step ST18 corresponding to control function of the slippage-factor specification portion 94, which is implemented to add one to the number N4 of times of occurrence of the micro slippage due to the other factor.

With the above-described control routine being repeatedly executed during running of the vehicle 10, each time when the micro slippage occurs, the various data upon occurrence of the micro slippage are memorized and stored in the electronic control apparatus 50, so as to infer the factor causing the micro slippage and the degree of the reduction of the durability of the transmission belt 40, based on the stored various data, wherein the various data upon occurrence of the micro slippage include the time of occurrence of the micro slippage, the heat quantity Qdot, the command pressure values Pintgt, Pouttgt and the actual pressure values Pin, Pout of the hydraulic actuators 34$c$, 38$c$ of the pulleys 34, 38, the differences $\Delta$Pin, $\Delta$Pout between the command pressure values Pintgt, Pouttgt and the actual pressure values Pin, Pout, and the input torque Tin. Further, with increase of the number N1 of times of occurrence of the micro slippage, the numbers N2, N3, N4 (i.e., the number N2 of times of occurrence of the micro slippage due to the hydraulic vibration, the number N3 of times of occurrence of the micro slippage due to the responsiveness defect and the number N4 of times of occurrence of the micro slippage due to the other factor) are increased and data of these numbers N2, N3, N4 are also memorized and stored in the electronic control apparatus 50. Then, with the stored various data being analyzed, for example, the factor causing the micro slippage and the degree of the reduction of the durability of the transmission belt 40 can be inferred. Therefore, for example, in a periodic inspection, with the various data being analyzed, it is possible to specify the factor causing the slippage and to rewrite programs for hydraulic control operations by taking account of the specified factor causing the slippage, for thereby improving controllability in the hydraulic control operations.

As described above, in the present embodiment, the occurrence of the micro slippage is determined when the first-order derivative $\Delta\gamma$ of the gear ratio $\gamma$ of the continuously-variable transmission 18 is not smaller than the first threshold value $\alpha 1$ and the second-order derivative $\Delta\Delta\gamma$ of the gear ratio $\gamma$ is not smaller than the second threshold value $\alpha 2$, so that the micro slippage can be accurately determined. For example, in an arrangement in which the occurrence of the micro slippage is determined based on only the first-order derivative $\Delta\gamma$ of the gear ratio $\gamma$, the micro slippage cannot be distinguished from an abrupt change of the gear ratio, which is caused by an abrupt shift operation or by an input from a road surface, by seeing only the first-order derivative $\Delta\gamma$ of the gear ratio $\gamma$. However, in the present embodiment, the occurrence of the micro slippage is determined based on not only the first-order derivative $\Delta\gamma$ of the gear ratio $\gamma$ but also the second-order derivative $\Delta\Delta\gamma$ of the gear ratio $\gamma$, so that the occurrence of the micro slippage can be determined with an increased accuracy.

In the present embodiment, when the occurrence of the micro slippage is determined, it is determined whether the heat quantity Qdot, which is the quantity of the heat generated by the micro slippage, is at least the third threshold value α3 or not. Thus, it is possible to determine whether the occurred micro slippage is a slippage by which the durability of the transmission belt 40 could be reduced. Further, it is possible to determine whether the occurred micro slippage is the micro slippage (that occurs for an extremely short time) or another type of slippage (such as a macro slippage), depending on whether the continuation time tcon of the occurred slippage is at most the fourth threshold value α4 or not. Further, the number N1 of times of the occurrence of the micro slippage is measured, so that the degree of reduction of the durability of the transmission belt 40 can be inferred based on the measured number N1 of times of the occurrence of the micro slippage. Further, the factor causing the micro slippage can be inferred based on the data upon the occurrence of the micro slippage, wherein the data include the command pressure value Pintgt and the actual pressure value Pin of the hydraulic actuator 34*c* of the primary pulley 34, the command pressure value Pouttgt and the actual pressure value Pout of the hydraulic actuator 38*c* of the secondary pulley 38, and the input torque Tin inputted to the continuously-variable transmission 18. Further, when the occurrence of the micro slippage is determined, it is further determined whether the hydraulic vibration has occurred or not, so that it is possible to infer whether or not the hydraulic vibration is the factor causing the micro slippage. Further, when the occurrence of the micro slippage is determined, it is further determined whether the responsiveness defect of the hydraulic pressure of the hydraulic actuator of the secondary pulley has occurred or not, so that it is possible to infer whether or not the responsiveness defect of the hydraulic pressure is the factor causing the micro slippage.

There will be described another embodiment of this invention. The same reference signs as used in the above-described first embodiment will be used in the following second embodiment, to identify the functionally corresponding elements, and descriptions thereof are not provided.

Second Embodiment

Figure 3:
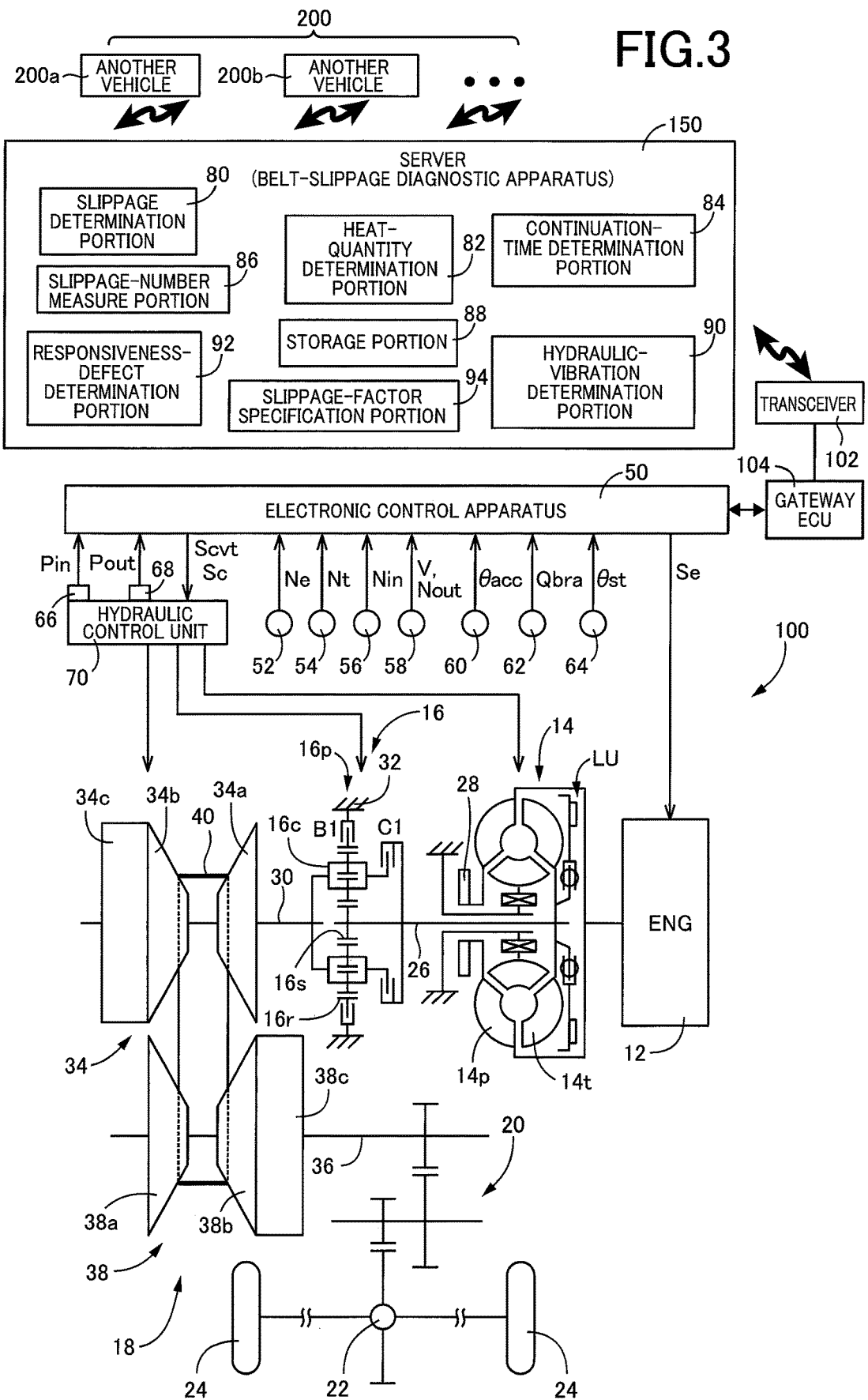
FIG. 3 is a schematic view showing a construction of a vehicle according to another embodiment of the present invention, and showing also major portions of control functions and control systems that are provided to perform various control operations in the vehicle.

In the above-described first embodiment, the various data are processed and stored in the electronic control apparatus 50 provided in the vehicle 10. However, the various data do not necessarily have to be processed in the electronic control apparatus 50 but may be processed in a server. FIG. 3 is a schematic view showing a construction of a vehicle 100 according to this second embodiment of the present invention, and showing also major portions of control functions and control systems that are provided to perform various control operations in the vehicle 100. In this second embodiment, the vehicle 100 is construed to be capable of communicating with a server 150. However, the other constructions in the second embodiment are substantially the same as those in the above-described first embodiment, and descriptions thereof are not provided. It is noted that, in the second embodiment, the server 150 corresponds to "belt-slippage diagnostic apparatus" recited in the appended claims. Further, it can be considered that, in the second embodiment, the electronic control apparatus 50 of the vehicle 100 cooperates with the server 150, or with the server 150 and electronic control apparatuses provided in the respective other vehicles 200, to constitute a belt-slippage diagnostic system for determining the occurrence of the slippage of the belt.

As shown in FIG. 3, the vehicle 100 includes a transceiver 102 and a gateway ECU 104.

The transceiver 102 is a device configured to communicate with the server 150 as an external device which is present apart from the vehicle 100 and is provided outside the vehicle 100. The server 150 is a system present on a network outside the vehicle 100, and is configured to receive, process, analyze, store (memorize) and supply the various data such as vehicle state information. The server 150 transmits and receives the various data to and from other vehicles 200 (200*a*, 200*b*, . . . ) as well as to and from the vehicle 100. The vehicle state information represents, for example, an operation or driving state relating to driving of the vehicle 100, which is detected by the various sensors or the like. This driving state is represented, for example, by the accelerator operation degree θacc and the running speed V. It is noted that the communication between the vehicle 100 and the server 150 may be made by a wireless communication through an antenna for an external network communication.

The gateway ECU 104 has substantially the same hardware construction as the electronic control apparatus 50, and is constituted by, for example, a relay device provided to rewrite programs and/or data stored in a rewritable ROM included in the electronic control apparatus 50. The gateway ECU 104 is connected to the transceiver 102, and is configured to rewrite the programs stored in the ROM, for example, through a wireless communication between the transceiver 102 and the server 150. The server 150 serves as a software distribution center configured to distribute programs for the rewriting.

As described above, the vehicle state information is supplied, as needed, to the server 150 through, for example, the transceiver 102, so that the vehicle state information is processed in the server 150. The occurrence of the micro slippage is determined, for example, based on the gear ratio γ of the continuously-variable transmission 18, which is supplied to the server 150. The data processing executed in this second embodiment is substantially the same as that in the above-described first embodiment, so that its specific description thereof is not provided. Thus, substantially the same data processing is executed in the server 150 as in the above-described first embodiment, so that it is possible to obtain substantially the same effects as in the first embodiment. Further, in the server 150, the various data upon the occurrence of the micro slippage and the above-described numbers N1, N2, N3, N4 of times serving to specify the factor causing the micro slippage are updated and accumulated, so that it is possible to analyze, for example, the factor causing the micro slippage, as needed, in the server 150. In connection with this feature, an update program suitable for the factor causing the micro slippage is supplied from the server 150 to the electronic control apparatus 50, and contents of the ROM in the electronic control apparatus 50 are suitably rewritten, so that a high degree of controllability can be constantly kept in the hydraulic control operations.

As described above, also in the present second embodiment in which the various data are processed in the server 150 provided apart from the vehicle 100, in substantially the same manner as in the above-described first embodiment, it is possible to obtain substantially the same effects as in the first embodiment. Further, the control programs stored in the ROM of the electronic control apparatus 50 can be updated, as needed, depending on the factor causing the micro slippage.

While the preferred embodiments of this invention have been described in detail by reference to the drawings, it is to be understood that the invention may be otherwise embodied.

For example, in the above-described second embodiment, the various data are processed and stored in the server 150. However, the second embodiment may be modified such hat the various data are proceed in the electronic control apparatus 50 and the processed data are stored in the server 150.

In the above-described embodiments, the occurrence of the hydraulic vibration and the occurrence of the responsiveness defect are determined based on the secondary pressure Pout that is the hydraulic pressure of the hydraulic actuator 38c of the secondary pulley 38. However, the occurrence of the hydraulic vibration and the occurrence of the responsiveness defect may be determined based on the primary pressure Pin that is the hydraulic pressure of the hydraulic actuator 34c of the primary pulley 34.

In the above-described embodiments, the transmission belt 40 is constituted by the compression-type endless annular transmission belt that includes the endless annular hoop and the multiplicity of thick-plate-shaped block elements that are held by the endless annular hoop so as to be arranged in their thickness direction corresponding to the circumferential direction of the transmission belt 40, along the endless annular hoop. However, the "belt" recited in the appended claims does not necessarily have to be the transmission belt 40 constructed as described above, but may be, for example, a chain belt constituted by an endless annular link chain including a plurality of link plates alternately superposed and mutually connected at their end portions through connecting pins. Further, the "belt" recited in the appended claims may be a rubber belt.

It is to be understood that the embodiments described above are given for illustrative purpose only, and that the present invention may be embodied with various modifications and improvements which may occur to those skilled in the art.

NOMENCLATURE OF ELEMENTS

18: belt-type continuously-variable transmission
34: primary pulley
38: secondary pulley
40: transmission belt (belt)
50: electronic control apparatus (belt-slippage diagnostic apparatus)
80: slippage determination portion
82: heat-quantity determination portion
84: continuation-time determination portion
86: slippage-number measure portion
88: storage portion
90: hydraulic-vibration determination portion
92: responsiveness-defect determination portion
150: server (belt-slippage diagnostic apparatus)
$\alpha 1$: first threshold value
$\alpha 2$: second threshold value
$\alpha 3$: third threshold value
$\alpha 4$: fourth threshold value

What is claimed is:

1. A belt-slippage diagnostic apparatus for a continuously-variable transmission that includes a primary pulley, a secondary pulley and a belt looped over the primary and secondary pulleys,
    the belt-slippage diagnostic apparatus comprising a slippage determination portion configured to determine occurrence of slippage of the belt on at least one of the primary and secondary pulleys, when a first-order derivative of a gear ratio, which is a ratio of a rotational speed of the primary pulley to a rotational speed of the secondary pulley, is not smaller than a first threshold value and a second-order derivative of the gear ratio is not smaller than a second threshold value.

2. The belt-slippage diagnostic apparatus according to claim 1, comprising a heat-quantity determination portion configured, when the occurrence of the slippage of the belt is determined by the slippage determination portion, to determine whether a heat quantity, which is a quantity of heat generated by the slippage of the belt, is a third threshold value or more.

3. The belt-slippage diagnostic apparatus according to claim 1, comprising a continuation-time determination portion configured to measure a continuation time for which the slippage of the belt has continued, and to determine whether the continuation time is a fourth threshold value or less.

4. The belt-slippage diagnostic apparatus according to claim 1, comprising a slippage-number measure portion configured to measure a number of times of the occurrence of the slippage of the belt.

5. The belt-slippage diagnostic apparatus according to claim 1, comprising a storage portion configured to store therein data upon the occurrence of the slippage of the belt,
    wherein the data include a command pressure value and an actual pressure value of a hydraulic actuator of the primary pulley, a command pressure value and an actual pressure value of a hydraulic actuator of the secondary pulley, and an input torque inputted to the continuously-variable transmission.

6. The belt-slippage diagnostic apparatus according to claim 5,
    wherein the data stored in the storage portion further include a heat quantity that is a quantity of heat generated by the slippage of the belt.

7. The belt-slippage diagnostic apparatus according to claim 1, comprising a heat-vibration determination portion configured, when the occurrence of the slippage of the belt is determined by the slippage determination portion, to determine whether a hydraulic vibration of a hydraulic pressure of a hydraulic actuator of the secondary pulley has occurred.

8. The belt-slippage diagnostic apparatus according to claim 1, comprising a responsiveness-defect determination portion configured, when the occurrence of the slippage of the belt is determined by the slippage determination portion, to determine whether a responsiveness defect of a hydraulic pressure of a hydraulic actuator of the secondary pulley has occurred.

* * * * *